L. E. TRUESDELL.
Car Axle.
No. 101,187. Patented March 22, 1870.
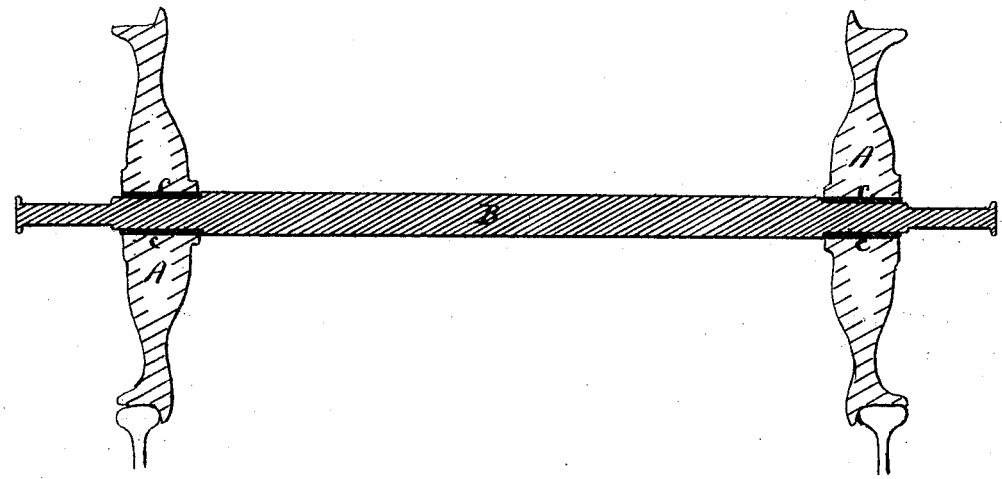
Witnesses:
J. B. Turchin
Jayhom Tosett
L. E. Truesdell
Inventor.

United States Patent Office.

LUCIUS E. TRUESDELL, OF CHICAGO, ILLINOIS.

Letters Patent No. 101,187, dated March 22, 1870.

IMPROVEMENT IN RAILROAD-CAR AXLES.

The Schedule referred to in these Letters Patent and making part of the same.

*To all whom it may concern:*

Be it known that I, LUCIUS E. TRUESDELL, of the city of Chicago, in the county of Cook and State of Illinois, have invented certain new and useful Improvements in "Railroad-Car-Axle Insulator;" and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use my invention, I will proceed to describe it.

The nature of my invention consists in interposing between a car-wheel and its axle a sleeve of rubber, gutta-percha, or other suitable elastic non-electrical-conducting material, in such a manner that while the wheel may be firmly attached to the axle there shall be no contact or connection between them except through the non-conducting sleeve.

The accompanying drawing represents a vertical section through the car-axle and wheels.

It is well known that the axles of railroad-cars when in use often become crystallized and break. Whether this is caused by vibration or the development of magnetic or electric currents is perhaps not fully established; but whatever may be the cause I have found that the interposition of a rubber, gutta-percha, or some other suitable elastic non-conducting sleeve between the wheel and the axle, in such a manner as to entirely and absolutely insulate the one from the other, so that there shall be no metallic contact between the two, has a tendency to prevent crystallization and consequent accident from any breaking of the axle because of such crystallization.

A A are the car-wheels, and

B is the axle.

C is a sleeve, made of India rubber or of any other suitable non-conducting-electrical material, passed on the axle at the place where the wheel sets, and the wheel is driven onto the axle so as to have the said rubber layer C between it and the said axle. The same arrangement is made when putting pulleys on their shafts in machinery, or in any other similar cases.

What I claim is—

So arranging and combining a sleeve of rubber, gutta-percha, or other elastic non-conducting material with a car-wheel and axle, so constructed that, while the former may be securely and firmly attached to the latter, there shall be no contact between them except through the sleeve, substantially as herein described and for the purpose set forth.

LUCIUS E. TRUESDELL.

Witnesses:
 J. B. TURCHIN,
 FOLSOM DORSETT,